July 10, 1945.  R. E. EGGERT  2,379,892
LOCK NUT
Filed Sept. 11, 1944
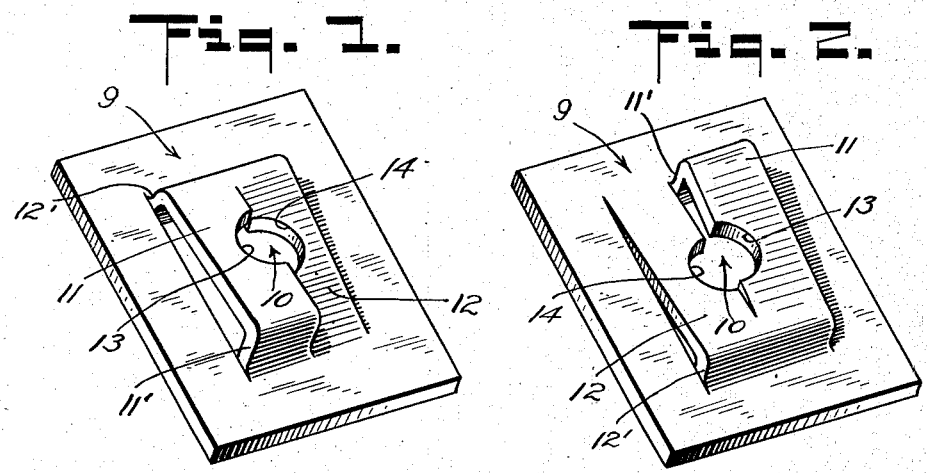
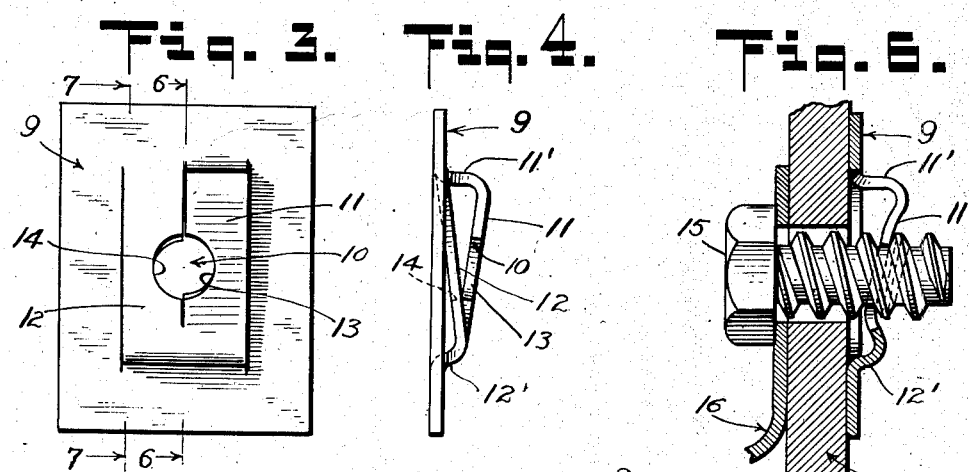
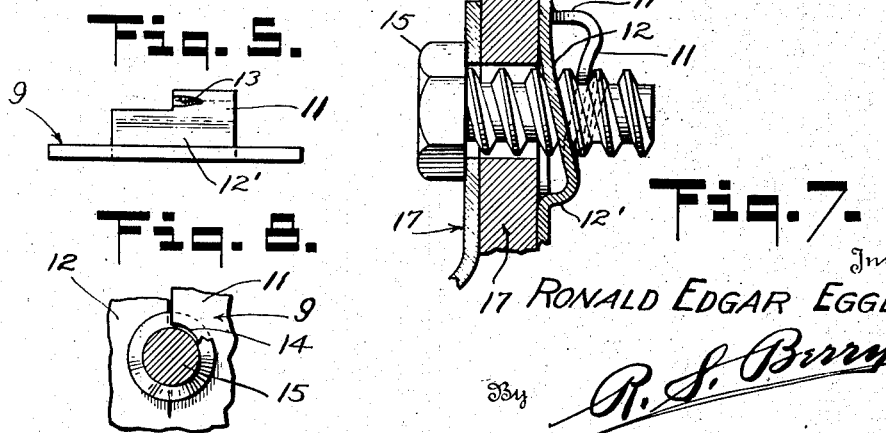
Inventor
RONALD EDGAR EGGERT
By R. S. Berry
Attorney Patented July 10, 1945

2,379,892

UNITED STATES PATENT OFFICE 2,379,892

LOCK NUT

Ronald Edgar Eggert, Burbank, Calif., assignor to Adel Precision Products Corp., a corporation of California Application September 11, 1944, Serial No. 553,640

5 Claims. (Cl. 85—36)

This invention relates to self locking nuts of the type made of resilient sheet metal and embodying integral tongue-like portions arranged to have screw threaded and tensioned engagement with a bolt, screw or like fastening.

Heretofore in this art bolt or screw engaging portions of the nut have been struck from a plate like body portion in the form of tongues having free outer ends. Due to the flexibility of these struck out resilient tongues they will, as a result of repeated use, become bent or distorted out of position in which an effective screw threaded and locking engagement thereof with the threaded fastening will take place. Moreover such a nut is weakened by reason of the locking tongue formation.

The primary object of this invention is to provide a lock nut of the character described which is stronger and more durable and efficient than similar nuts heretofore made as well as comparatively simple as to construction and subject to more expeditious manufacture and less likely to become impaired by repeated use, by reason of the sheet metal resilient body portion thereof being constructed and arranged to provide spaced elongated bridge portions within its confines and which are struck outwardly from the plane of the body portion and of themselves constructed and arranged to present at points intermediate their ends, opposed arcuate edges adapted to have tensioned and screw threaded engagement with a nut or bolt inserted in the opening defined between said edges; the "ends" of said portions remaining in integral formation with the body portion and the remainder thereof being resilient and adapted to yield and lockingly grip a screw or bolt which is tightened in the nut.

Another object of my invention is to provide a nut of the character described wherein the two outwardly struck portions of the plate-like body of the nut are in the form of straps or bridges inclined in opposite directions, with one portion extended outwardly somewhat beyond the other, so that not only will the arcuate bolt or screw engaging opposed edges thereof have a spiral pitch to afford the desired screw threaded contact thereof with the screw or bolt, but will be yieldable relative to the body itself and when the screw or bolt is tightened, will have a tensioned and locking contact therewith.

With the foregoing objects in view, together with such other objects and advantages as may subsequently appear, the invention resides in the parts and in the combination, construction and arrangement of parts hereinafter described and claimed, and illustrated by way of example in the accompanying drawing in which:

Fig. 1 is a perspective view of a nut embodying my invention.

Fig. 2 is a similar perspective view of the nut looking toward the side opposite that in the foreground of Fig. 1.

Fig. 3 is a bottom plan view of the nut.

Fig. 4 is an edge or side elevation of the nut.

Fig. 5 is an end elevation of the nut.

Fig. 6 is an enlarged vertical sectional view taken on the plane of line 6—6 of Fig. 3 showing a typical installation of the nut.

Fig. 7 is an enlarged fragmentary sectional view taken on the plane of line 7—7 of Fig. 3 showing the nut installed as in Fig. 6.

Fig. 8 is a fragmentary front elevation and part sectional view showing how portions of the nut have threaded engagement with a screw or bolt.

Referring now more specifically to the drawing it is seen that a nut embodying my invention includes a plate-like body portion 9 made of suitable resilient sheet metal of small gage, provided with a central opening 10, and die stamped or otherwise treated to form elongated bridge or loop portions 11 and 12 lying side by side in outwardly offset relation for the most part from one side of the body portion. Opposed edge portions of these bridge portions bisect the opening 10 so that said bridge portions are provided between their ends with opposed arcuate or semi-circular edges 13 and 14 as complementary margins of the opening 10 and which are adapted for screw threaded engagement with a threaded fastening 15 as shown in Figs. 6, 7 and 8.

It should be noted that the ends of the bridge portions 11 and 12 remain in integral formation with the body portion 9 and that the portion 11 adjacent one end and for the most part, is outwardly offset from the corresponding portions of bridge portion 12. In other words the portion 11 has a greater outward extent than portion 12.

As here shown, the portions 11 and 12 are oppositely inclined and have end portions 11 and 12 which extend substantially right angularly outward from points where formed integral with the body portion. This relative offsetting and opposite inclination of the bridge portions 11 and 12 gives the arcuate edge portions 13 and 14 a spiral pitch whereby they will have the proper screw threaded engagement with the threads of the fastening 15. Due to the resiliency of the metal and bridge formation and relative arrangement of portions 11 and 12 they will have a yieldable and tensioned contact with the fastening and will bow inwardly as shown in Fig. 6 when the fastening is tightened as for example in securing two parts together, such as members 16 and 17, as shown in Figs. 6 and 7. This bowing of the portions 11 and 12 increases the tension thereof and causes them to have a tighter threaded contact with member 15 thereby locking the nut thereon so that it will not be likely to work loose under vibration. Moreover the edges 13 and 14 are caused to bite into the member 15 when bowed inwardly as shown in Fig. 6.

Upon loosening the member 15, the portions 11 and 12 will spring back to original formation shown in Figs. 2, 3 and 4. However, if the pitch of the opposed edge portions 13 and 14 does not correspond to the pitch of the threads of the member 15, it is apparent that in screwing the member 15 into the nut, the portions 11 and 12 will be somewhat bowed so as to have tensioned threaded contact with the member 15 before it is tightened to the extent indicated in Fig. 6.

As here shown, the bridge portions 11 and 12 are defined between three longitudinal and parallel slits equidistantly spaced from one another and formed in striking said portions outwardly from the plane of the body portion. The center slit intersects the opening 10 and is shorter than the other slits since it only has to intersect opposite marginal portions of said opening to provide for the spiral pitch arrangement of the edges 13 and 14.

The bridge formation of portions 11 and 12 assures strength to prevent permanent distortion of said portions which would occur if they were tongue like and free at certain ends as heretofore made in the art. However the portions 11 and 12 have adequate spring action to insure a self-locking action of the nut in the manner hereinbefore described and the nut is made stronger and more durable and efficient by reason of the bridge formation of the screw or bolt engaging portions thereof.

The nut hereof in being particularly light as to weight yet strong and self-locking is ideally suited to aircraft and automotive uses wherein nuts are subject to considerable vibration.

While I have shown and described a specific embodiment of my invention I do not limit myself to the exact details of construction set forth, and the invention embraces such changes, modifications and equivalents of the parts and their formation and arrangement of the parts and their formation and arrangement as come within the purview of the appended claims.

I claim:

1. In a lock nut, a resilient metal body portion, bridge portions struck out from the plane of the body portion and lying side by side with their ends in integral formation with the body portion, and complementary opposed arcuate edge portions on said bridge portions defining between them an opening in which a screw or bolt may be turned so as to have tensioned and screw threaded engagement therewith.

2. In a lock nut, a resilient metal body portion, bridge portions struck out from the plane of the body portion and lying side by side with their ends in integral formation with the body portion, and complementary opposed arcuate edge portions on said bridge portions defining between them an opening in which a screw or bolt may be turned so as to have tensioned and screw threaded engagement therewith, said bridge portions being inclined in opposite directions and said arcuate edge portions being angularly related to one another and one of them at least in part spaced outwardly from the body portion a greater distance than the other.

3. In a lock nut, a resilient metal body portion, bridge portions struck out from the plane of the body portion and lying side by side with their ends in integral formation with the body portion, and complementary opposed arcuate edge portions on said bridge portions defining between them an opening in which a screw or bolt may be turned so as to have tensioned and screw threaded engagement therewith, said bridge portions being elongated and arranged in oppositely inclined relation, with one of them extended at least in part a greater distance outwardly from said body portion than the other whereby said arcuate edge portions have a spiral pitch.

4. In a lock nut, a resilient metal body portion, bridge portions struck out from the plane of the body portion and lying side by side with their ends in integral formation with the body portion, and complementary opposed arcuate edge portions on said bridge portions defining between them an opening in which a screw or bolt may be turned so as to have tensioned and screw threaded engagement therewith, said bridge portions having straight opposed edge portions on opposite sides of said arcuate edge portions.

5. In a lock nut, a body portion, and resilient bridge portions struck out from the body portion and disposed side by side with their ends in integral formation with said body portion, said bridge portions being oppositely inclined and having their adjacent edges formed to provide an opening in which a screw threaded element may be turned to have tensioned and screw threaded engagement therewith.

RONALD EDGAR EGGERT.